United States Patent
Maalouf et al.

(10) Patent No.: US 8,598,977 B2
(45) Date of Patent: Dec. 3, 2013

(54) SYSTEM AND METHOD FOR DRIVER TRAINING IN A CONTROLLED DRIVING ENVIRONMENT

(75) Inventors: Pierre Maalouf, Duluth, GA (US); Georges Moussa, Alpharetta, GA (US)

(73) Assignee: Tiny Towne International LLC, Norcross, GA (US)

(*) Notice: Subject to any disclaimer, the term of this patent is extended or adjusted under 35 U.S.C. 154(b) by 300 days.

(21) Appl. No.: 13/087,403

(22) Filed: Apr. 15, 2011

(65) Prior Publication Data

US 2011/0254655 A1   Oct. 20, 2011

Related U.S. Application Data

(60) Provisional application No. 61/325,135, filed on Apr. 16, 2010.

(51) Int. Cl.
G05B 23/02 (2006.01)

(52) U.S. Cl.
USPC ............ 340/3.1; 340/438; 340/439; 340/576; 340/905; 345/156; 382/104; 434/65; 455/345; 455/456.3; 701/1; 701/301; 701/31.4; 701/70; 701/84; 703/8; 705/4

(58) Field of Classification Search
USPC ........... 340/438, 576, 905; 345/156; 382/104; 434/65; 455/345, 456.3; 701/1, 301, 701/31.4, 70, 84, 96; 703/8; 705/4
See application file for complete search history.

(56) References Cited

U.S. PATENT DOCUMENTS

| | | | | |
|---|---|---|---|---|
| 5,173,859 | A * | 12/1992 | Deering | 701/70 |
| 6,275,231 | B1 * | 8/2001 | Obradovich | 345/156 |
| 6,502,035 | B2 * | 12/2002 | Levine | 701/301 |
| 6,516,273 | B1 * | 2/2003 | Pierowicz et al. | 701/301 |
| 6,546,119 | B2 * | 4/2003 | Ciolli et al. | 382/104 |
| 6,629,029 | B1 * | 9/2003 | Giles | 701/31.4 |

(Continued)

FOREIGN PATENT DOCUMENTS

| | | | | |
|---|---|---|---|---|
| KR | 10-2003-0031230 | 4/2003 | | B60K 41/00 |
| KR | 10-2004-0073816 | 8/2004 | | G08G 1/0969 |

OTHER PUBLICATIONS

International Search Report & Written Opinion from International Application No. PCT/US11/032606.

*Primary Examiner* — Daniel Wu
*Assistant Examiner* — Israel Daramola
(74) *Attorney, Agent, or Firm* — Womble Carlyle Sandridge & Rice LLP

(57) ABSTRACT

A method and system for monitoring and controlling driver performance in a controlled driving environment. A portable information device is provided to a driver who registers with a server computer for controlling vehicle operation in the driving environment. A record for the driver is stored in a database associated with the server computer. A vehicle is activated using the portable information device for at least an amount of time exceeding a preset threshold value. A speed level and a safety level for the vehicle are dynamically set based on the driver's performance in the driving environment. The driver's performance is monitored in the controlled driving environment and each driving violation that occurs is determined. Violation points are assigned to the driver based on each driving violation and the violation points are added to the driver record stored in the database. The speed level is set to a value less than a threshold speed level if the violation points stored for the driver exceeds a threshold for violation points.

21 Claims, 15 Drawing Sheets

(56) References Cited

U.S. PATENT DOCUMENTS

| | | | |
|---|---|---|---|
| 7,424,414 B2 * | 9/2008 | Craft ............................... | 703/8 |
| 7,692,552 B2 * | 4/2010 | Harrington et al. ........... | 340/576 |
| 7,996,138 B2 * | 8/2011 | Rehm et al. ..................... | 701/84 |
| 8,031,062 B2 * | 10/2011 | Smith ........................... | 340/438 |
| 8,140,358 B1 * | 3/2012 | Ling et al. ........................ | 705/4 |
| 8,301,108 B2 * | 10/2012 | Naboulsi ....................... | 455/345 |
| 8,323,025 B2 * | 12/2012 | Freund et al. .................. | 434/65 |
| 2004/0236476 A1 | 11/2004 | Chowdhary | |
| 2008/0255722 A1 * | 10/2008 | McClellan et al. ............ | 701/35 |
| 2008/0300731 A1 * | 12/2008 | Nakajima et al. ................ | 701/1 |
| 2008/0319602 A1 * | 12/2008 | McClellan et al. ............ | 701/33 |
| 2009/0224942 A1 * | 9/2009 | Goudy et al. ................. | 340/905 |
| 2009/0284361 A1 * | 11/2009 | Boddie et al. ................. | 340/439 |
| 2010/0030582 A1 * | 2/2010 | Rippel et al. ...................... | 705/4 |
| 2011/0010042 A1 * | 1/2011 | Boulet et al. .................... | 701/33 |
| 2011/0010068 A1 * | 1/2011 | Imai et al. ....................... | 701/96 |
| 2011/0077028 A1 * | 3/2011 | Wilkes et al. ............. | 455/456.3 |

\* cited by examiner

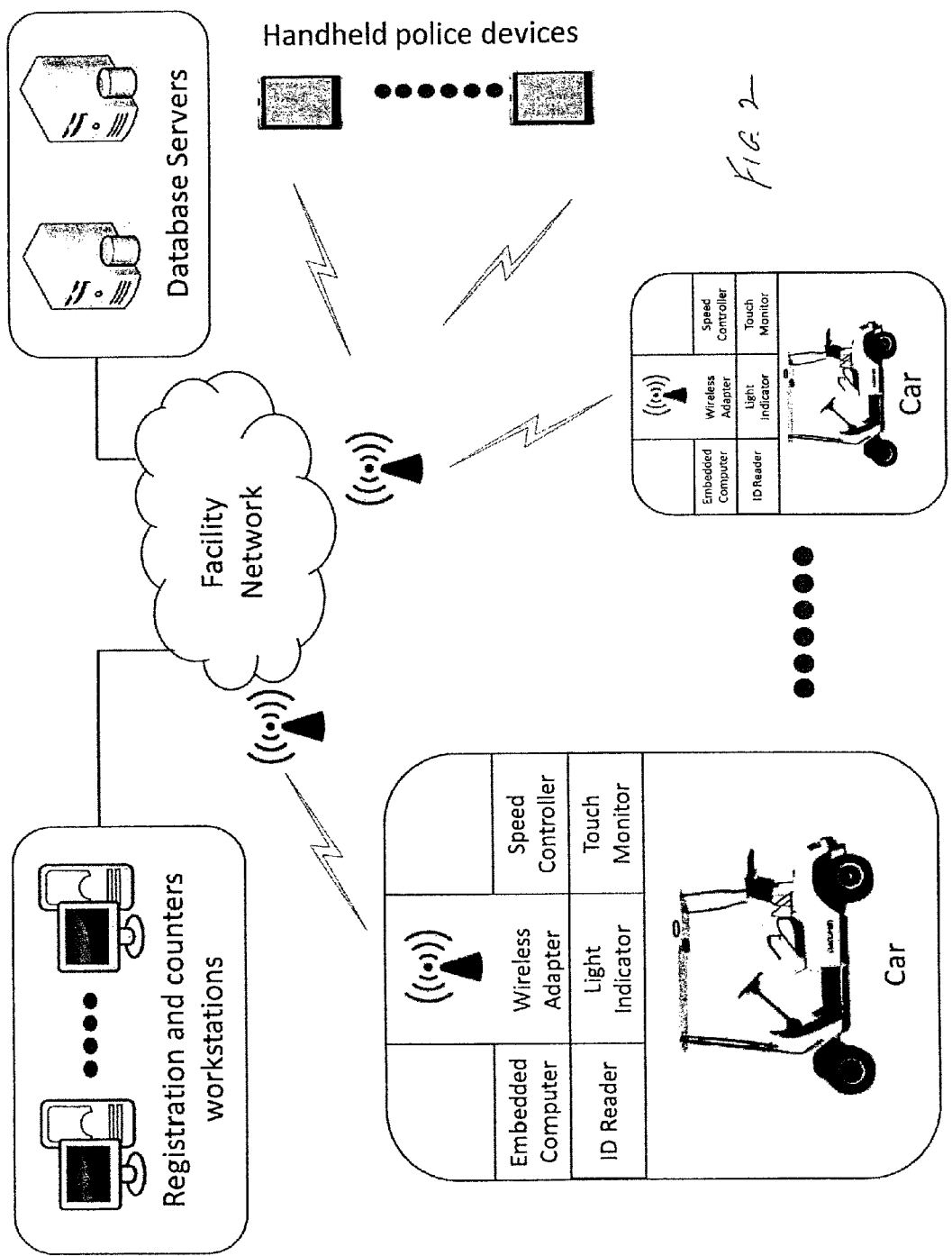

SYSTEM AND METHOD FOR DRIVER TRAINING IN A CONTROLLED DRIVING ENVIRONMENT

CROSS-REFERENCE TO RELATED APPLICATION

This application claims the benefit of U.S. provisional patent application Ser. No. 61/325,135, filed on Apr. 16, 2010. The specification and drawings of the provisional patent application are specifically incorporated by reference herein.

BACKGROUND OF THE INVENTION

Embodiments of the invention relate generally to training of young individuals on safe operation of vehicles in a controlled driving environment. More particularly, the embodiments relate to monitoring and improving the performance of a young driver operating a vehicle equipped with embedded monitoring and control apparatus in communication with at least one host computer located within the controlled driving environment.

SUMMARY OF THE INVENTION

In one embodiment, a method is provided for monitoring and controlling driver performance in a controlled driving environment. A portable information device is provided to a driver who registers with a server computer for controlling vehicle operation in the driving environment. A record for the driver is stored in a database associated with the server computer. A vehicle is activated using the portable information device for at least an amount of time exceeding a preset threshold value. A speed level and a safety level for the vehicle are dynamically set based on the driver's performance in the driving environment. The driver's performance is monitored in the controlled driving environment and each driving violation that occurs is determined. Violation points are assigned to the driver based on each driving violation and the violation points are added to the driver record stored in the database. The speed level is set to a value less than a threshold speed level if the violation points stored for the driver exceed a violation points threshold.

In one embodiment, a system is provided for monitoring and controlling driver performance in a controlled driving environment. The system includes at least one server computer for controlling operation of a vehicle in the driving environment via a wireless transceiver at the server location. The system also includes at least one storage device for storing driver records for each driver registered with the server computer. An embedded mobile client in the vehicle includes a microprocessor having monitoring and control firmware embedded in a memory, a wireless transceiver for communicating with the server computer, a speed controller device connected to the microprocessor for automatically controlling a speed of the vehicle during operation in the driving environment, a portable information device reader for receiving driver information stored on a portable information device provided to each registered driver in order to activate the vehicle via a signal from the microprocessor, and a touch screen user interface for displaying a driving time remaining, an accumulated violation points, and a safety level for the driver.

BRIEF DESCRIPTION OF THE DRAWINGS

These and other advantages and aspects of the embodiments of the invention will become apparent and more readily appreciated from the following detailed description of the embodiments taken in conjunction with the accompanying drawings, as follows.

FIG. 2 illustrates the system architecture of the driver training system in an exemplary embodiment.

DETAILED DESCRIPTION

Figure 1A:
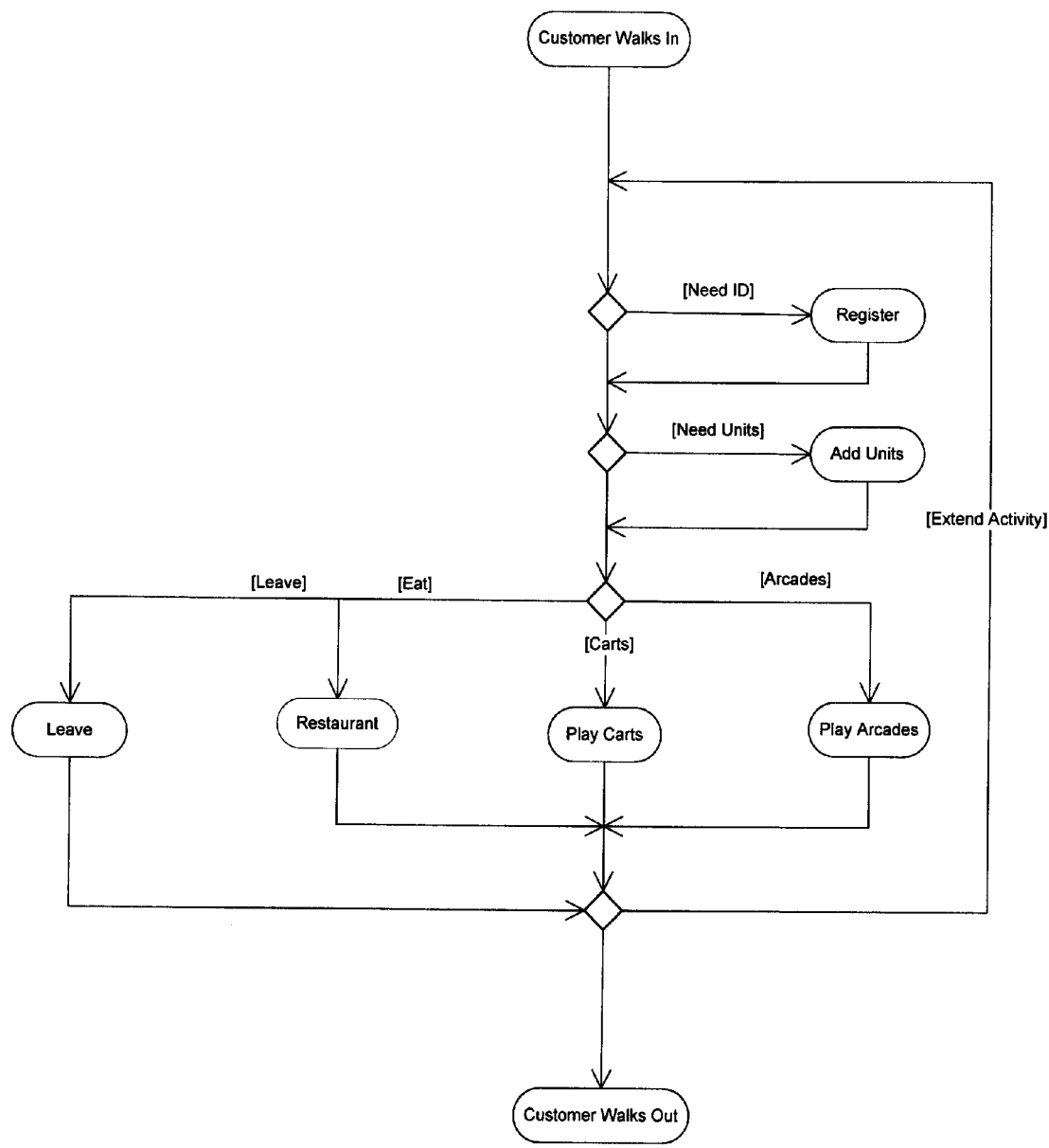
FIGS. 1A-1D provide an overview of the processes associated with the controlled driving park in an exemplary embodiment.

The following description is provided as an enabling teaching of exemplary embodiments. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances, and are a part of the invention. Thus, the following description is provided as illustrative of the principles of the embodiments and not in limitation thereof, since the scope of the invention is defined solely by the claims.

The disclosed embodiments provide a way to teach children how to drive a vehicle safely and how to apply driving ethics and etiquette in a controlled driving environment while making the whole learning and driving experience interesting and enjoyable to the young drivers.

In an exemplary embodiment, a driver swipes his driving park issued portable information device (e.g., magnetic ID card) in a portable information device reader in the vehicle. As used herein, a vehicle refers generically to an electronic cart or modified golf cart that is used by drivers in the controlled driving environment, though other kinds of vehicles may be utilized. The information stored on the driver's portable information device is collected by the vehicle controller which sends a query to the data base server and receives a credits/units balance from the driver record as well as the driving expertise level according to a set of driving courses and tests that a driver takes in a simulator prior to driving a vehicle. The credits/units balance determines if the vehicle can be activated and how long a driver can drive the vehicle. The driver's expertise level determines the maximum speed that a driver can drive the vehicle. The controller automatically sets the maximum speed in the vehicle control. A flashing light is installed on top of the vehicle that lights according to different sets of light flashing patterns, signaling the near end of the driving time, and/or other traffic/driving limitation, e.g., driver can or cannot drive on the highway. The light signal also warns a police officer in the driving park to issue violation tickets to the driver and/or the light signal warns the safety teams to act in a timely fashion and reroute the driver to the proper driving zone. A police officer can issue, through a handheld device, driving warnings and violations to the driver and record them into the driver's driving history database record. The driver pays a penalty in any combination of driving time, units, and/or degraded maximum speed depending on the type of violation.

Overview of Controlled Driving Park Operation

FIGS. 1A-1D provide an overview of the processes associated with the controlled driving park in an exemplary embodiment. A driver must go through a set of five computer simulated driving lessons and exams, and upon passing the driving exams and based on the driving expertise level acquired, a driver can drive a vehicle at predetermined maximum speeds, with or without an accompanying adult.

A customer walks in to the welcome desk in the driving park which, as illustrated in FIG. 1A, includes a number of amusements that can be enjoyed by the individual driver and accompanying adult. If the customer is new, he will be issued a portable information device (sometimes referred to herein as the "ID Device") such as, but not limited to, an identification card, which identification card may include, for example, any of a smart card, RFID tag, magnetic card, or bar coded card having the customer's picture, name, date of birth, school, address, organ donor, blood type, sex, exam date and driving park location code. Portable information device refers broadly to any type of device capable of storing personal and driving park information concerning the driver. In an exemplary embodiment, the portable information device may include an embedded microprocessor and non-volatile memory. In some embodiments, the portable information device may include a receiver/transmitter. Three different categories of customers can be accommodated, as explained in the following paragraphs.

A member already registered with the driving park and having a portable information device can, in a manner appropriate for the device (for example, swiping an ID card), update his portable information device with information stored in a central driving park database and enter the driving park. The "updating" takes place at a device reader that appropriately communicates with the personal information device. An appropriate reader is to be located in the vehicle and/or in stationary locations around the park. The parents who accompany the young drivers do not have to have driving park portable information devices; however, at least one parent must accompany a driver, and no adults are allowed in the driving park unless they accompany the driver.

First time visitors who have pre-registered and/or have made a reservation, and already have their information uploaded on the driving park web site will be ready to have their pictures taken and their portable information device (e.g., identification cards) created and issued. A designated host welcomes the visitors and explains the required procedures that must be adhered to in order to utilize the features of the driving park.

The third category of customers is a walk-in customer who must register with the diving park upon entry in order to obtain an identification device. Once the portable information device is issued, drivers with reservations will be admitted on time and drivers without reservation will be admitted on a first come, first serve basis.

Once the portable information device is issued, the holder can access the driving park web site, log in and take the driving tests; starting with level one and going up to the last level. When the portable information device holder passes the first level, he will be qualified to take the next level test until all levels are passed. The driver then can apply for the driving park driver's license.

Figure 1B:
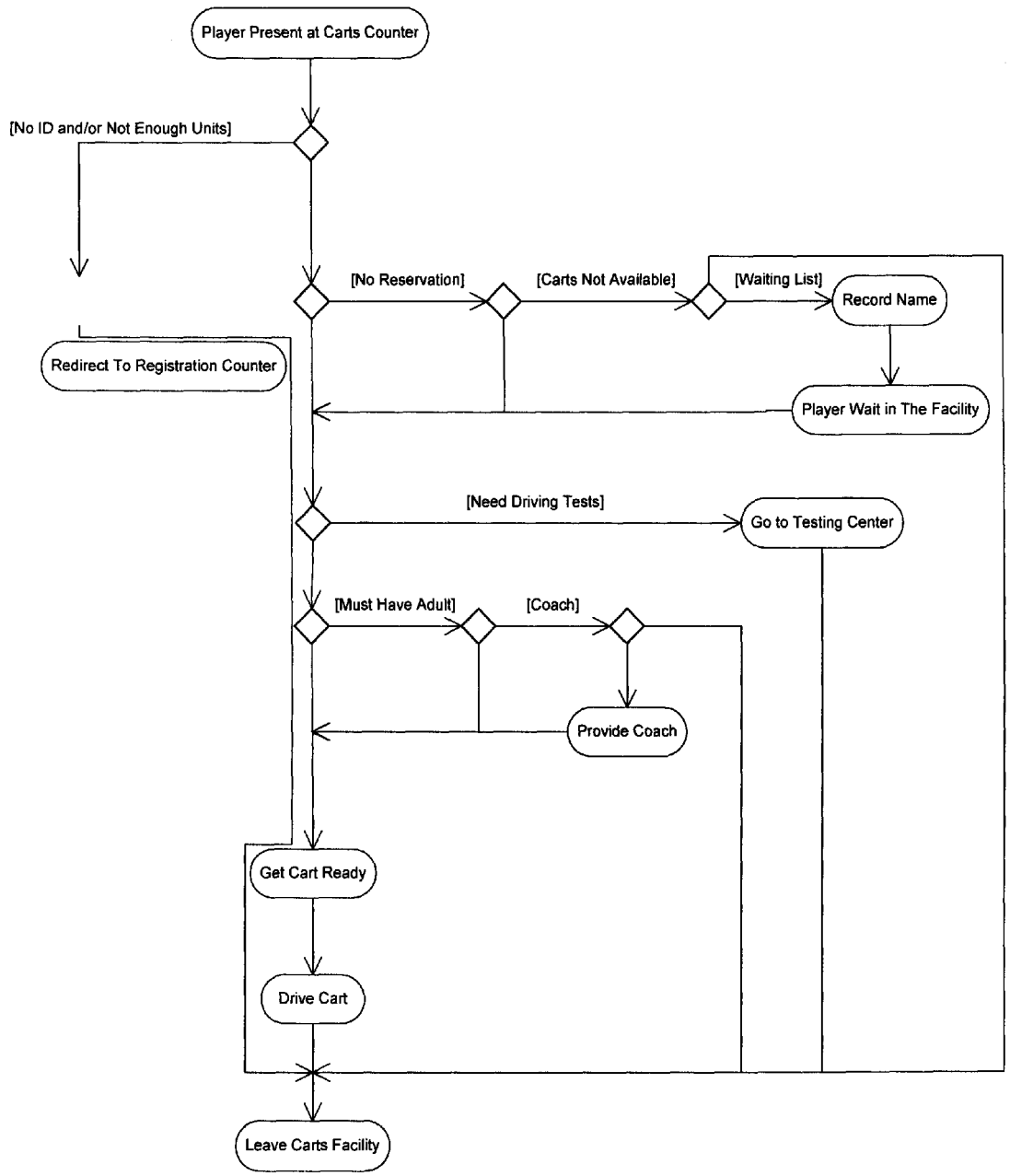
Figure 1C:
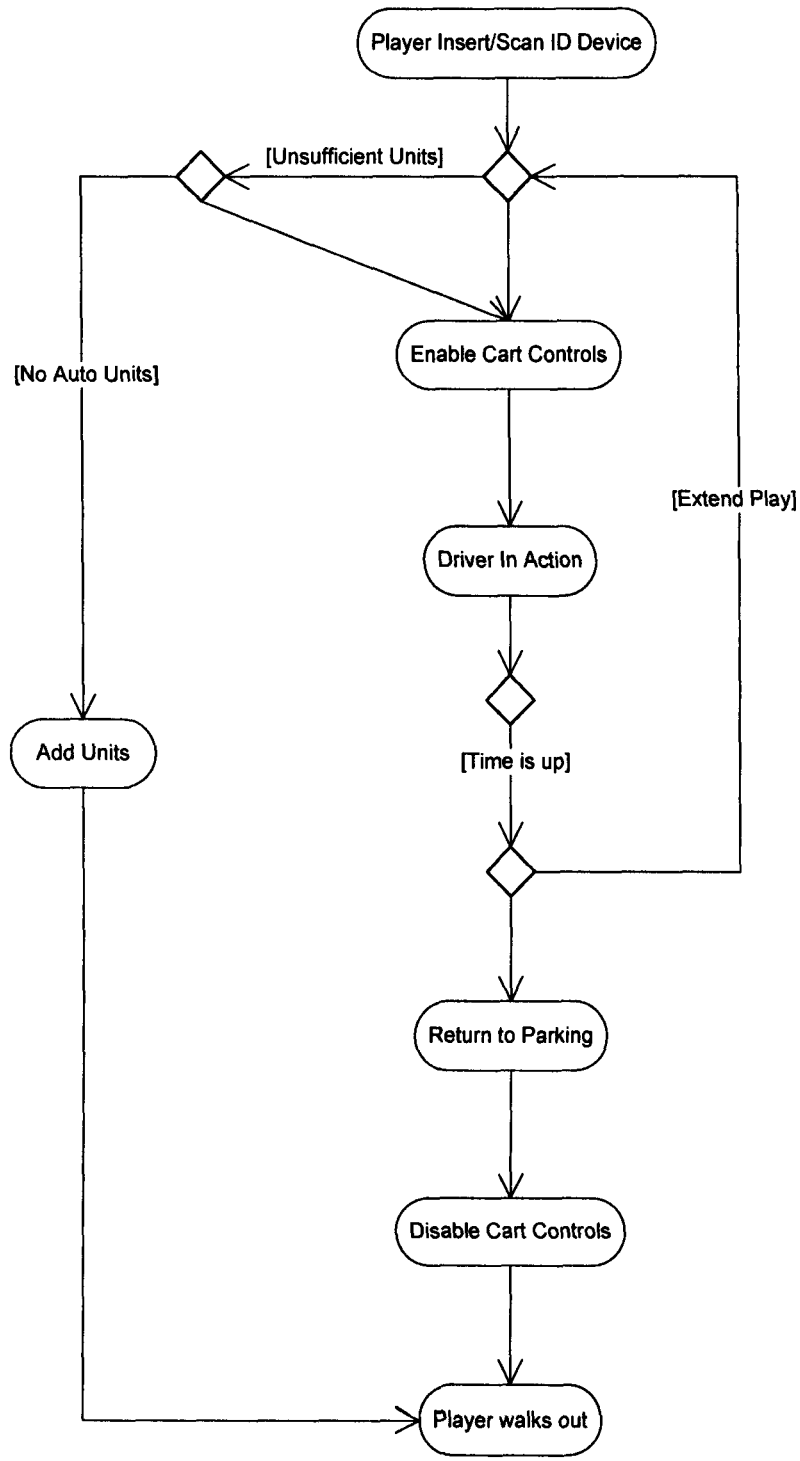
Figure 1D:
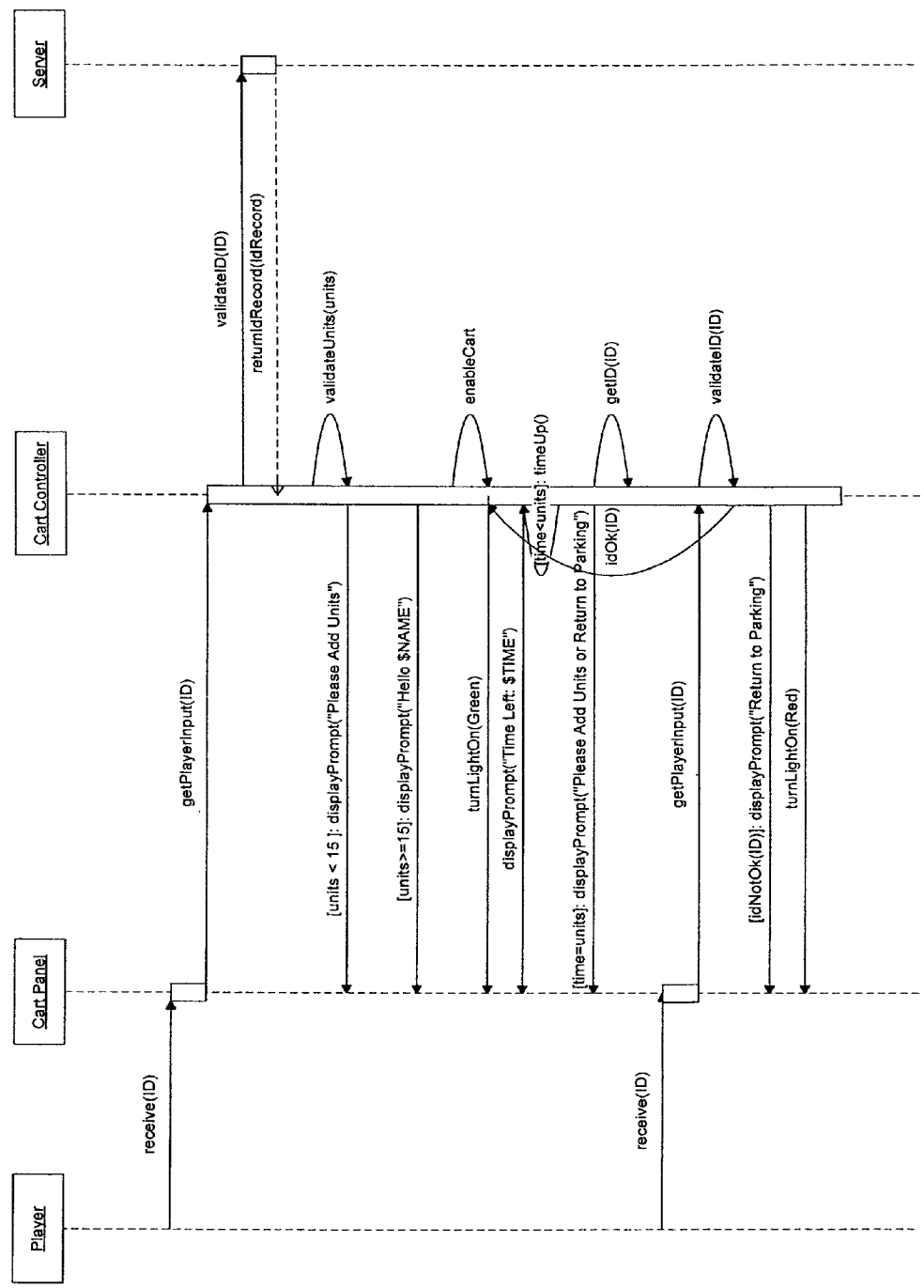

FIG. 1B illustrates the various activities involved in getting a driver from the registration desk to the vehicle. FIG. 1C illustrates the various activities involved in the "drive cart" process of FIG. 1B. FIG. 1D illustrates the various activities involved in the "enable cart controls" process of FIG. 1C.

A class room is located in proximity to the police department, and is equipped with a big screen television and DVD connection, along with multiple kiosks for taking driving tests. The main building in the driving park also houses a restaurant, an arcade, a police department, restrooms, class rooms, and souvenir shop and administration offices.

All registered drivers can charge driving time to their portable information devices at the welcome desk, or at any of the self service kiosks, or at the point-of-sale (POS) amusements in the diving park. The ID device can be used to purchase food, play games in the arcade, or drive a vehicle. Regardless of the driving time added to the ID device at any of the points of sale (POS), in order to operate a vehicle the driver must complete a minimum learning process as described below.

Using the portable information device, a driver will go to the arcade and drive a vehicle simulator. The vehicle simulator will generate a report at the end of the driving experience. If the driver drives the vehicle simulator a minimum number of minutes (e.g., 15 minutes) without incurring any driving violations, he will be granted permission to drive a vehicle in the driving park. The permission to drive appears on the simulator screen and will automatically update the driver's stored database record. The portable information device can now activate a vehicle. If the driver fails the simulator test, he will have to keep taking the simulator test until he passes. The driver can take the simulator test repeatedly until he passes.

Maintained as part of each driver's database record, and associated with the driver's respective portable information device is an account reflecting the above mentioned credits/units balance. In one embodiment, in order to drive a vehicle, the driver must have a minimum number of credits/points, which is equivalent to a number of minutes, for example at least 15 points which is equivalent to 15 minutes, of driving time. Drivers may check their available credits/units at any POS or any kiosk in the driving park. In other embodiments, fewer or more points may be required in order to operate a vehicle.

Once the driver has a validated ID device for driving in the driving park, he can proceed to the vehicle leasing office where his portable information device will be checked and a vehicle will be assigned. When the ID device is read by the device reader (for example, when an ID card is swiped in an appropriate card reader), a driver will receive driving time for the assigned vehicle based on the points in his/her account. The driver must have the minimum required credits on his/her ID device in order to be able to start the vehicle; but if a driver completes a level of speed without any violation he will be rewarded an additional number of credits and the extra speed. If a driver commits any traffic rule infraction, he will be pulled over by a driving park officer and receive a ticket or a warning. Both tickets and warnings will go on the driving record and the driver cannot receive more than one warning of any type. A ticket will mean, for example, disabling the driver's car for a number of minutes that goes on his driver records based on the level of violation, reducing his safety level, and losing the extra free 15 minutes reward.

A charging device is provided in every vehicle, in order to activate the vehicle instantly when the ID device is read. The touch screen on the dashboard in the vehicle will display a message to the driver to press the "On" button to start the vehicle. The system will automatically debit the driver's account the minimum number of minutes and will display the driving time available on the touch screen. As long as the ID device is inserted in the charging device, the associated account is being debited at a certain rate per minute. Five minutes before the driver's account runs out of credits/units (and thus out of time), the onboard processor signals a light on the top of the vehicle; two minutes later it will turn into a flashing light. A message will be posted on the dashboard screen informing the driver of the time left. If the vehicle is not returned to the parking area on time or is left on a street, the driver will get a ticket for an "abandon and run" violation. The system will automatically generates an email to the driver informing him to expect a debit on his account due to not returning the car at the proper time.

Once the driver gets in the vehicle and causes his ID device to be read, the console screen welcomes him and shows him how many minutes are available to him. Once the driver obtains the driving park driver's license, he will earn more points for driving by payment of additional money.

The driver presses start to start the vehicle for a minimum driving time of, for example, fifteen minutes. After, for example, 15 minutes of driving has elapsed, the driver can take the vehicle back and stop the accrual of charges by pressing the "Park & Stop" button on the touch screen user interface.

When the driver starts his first, for example, 15 minutes of driving time, he must pay close attention to the time meter on the touch screen display console. As long as the driver has a green light on the console, he can continue normal driving. However, once the orange light illuminates, the driver has to start thinking about an exit strategy. If the orange light starts flashing and the red light then illuminates, there is less than, for example, two minutes of driving time left. The driver either has to add driving time or return the vehicle to the leasing parking area. A penalty will be given to the driver who runs out of points before returning to the leasing area. The penalty will also be emailed to the driver in case he did not have enough credits on his card.

When the driver has completed, for example, 120 minutes of successful driving, along with all required tests, he will be eligible for a driving park driver's license. The driver is not allowed to drive on the driving park advanced driver's road until he has completed the driving test which includes several chapters. The driving test is available for all members on the driving park website. All levels must be taken and passed before the driver is eligible for a driver park driver's license. Once all chapters are completed, the driver will be interviewed by a driving park officer and, based on positive interview results, the driver will be granted a driver park driver's license.

If the driver has any violation points on his driving record, he will be warned at the start time. Violation points are added to a violation meter on the touch screen console indicating the level of violations. Once the driver has driven, for example, 120 minutes without any violations, all previous violation points will be removed. The speed of the vehicle will be based on the driver's test results. The vehicle can be operated, for example, at three different speeds. It takes, for example, 60 minutes of safe driving without any violation points to raise the speed level of the vehicle.

In one embodiment, any violation points go on the driver's record stored in the database and automatically reduces the driving time meter by, for example, three times the value of a violation. For example, running a stop sign could add 5 points to the violation meter driver's record and reduce the Safety Level (SL) by 15 points. The safety level is displayed on the touch screen display. For example, a driver who has a safety level of 70 has been driving at level 2 for ten minutes; however, if he gets a ticket for running a stop sign, the safety level will be reduced to 55 which take the driver back to level 1. At a safety level of, for example, 60, the speed level changes from speed one to speed two, and at a safety level of 120, the speed goes from speed two to speed three.

The driver can take the web-based tests to lower his violation points, for example, by 2 points per level, or a total of 10 points for all five levels. Performing a community service can also reduce the driver's violation points at the rate of, for example, 1 point/hour. The driver must check with driving park management for approved services. After, for example, 120 minutes of safe driving without any violations, the driver's record will automatically update and erase any previous violation points. The driver can also be rewarded with additional driving time. Every time there is a change to the driver's record, he will receive a message on the touch screen console in the vehicle informing him of the update. After, for example, 60 minutes of continuous safe driving, the vehicle speed will go from speed level 1 to speed level 2, and after, for example, 120 minutes of safe driving time to speed level 3. After, for example, 120 minutes of safe driving and successful passing of all tests, the driver will be eligible for a driving park driver's license. When the driver receives the driving park driver's license, he will be able to drive on the highway that loops around the driving park and on other restricted roads, depending on the particular design of the driving park.

The patrol officer has a handheld device that enables him to read the driver's information by, for example, typing the plate number on his device, add information to the driver's file, and debit the driver's card for the value assigned to each driving violation, as required. The patrol officers have a card that activates the vehicle for the time used only. The driving feature can be cancelled in any vehicle in order to stop reckless drivers or drivers talking on a cell phone.

Every time the driver violates a traffic rule, the patrol officer will pull him over and give the driver a penalty including points that are determined from his card and are added to his record. The officers on duty may opt to give the driver a warning, but they cannot give any driver more than one warning per type of violation. If the driver gets over, for example, 25 violation points, his vehicle will go to a minimal speed, which is basically below level one. A message on the console will inform the driver to update his record before he can activate a vehicle again. The driver must then talk to a patrol officer to reactivate his card.

The table below illustrates the violation points that can be assigned for various driving violations in an exemplary embodiment.

TABLE 1

| Violation | Points |
|---|---|
| Stop sign | 5 |
| Unbuckled seat belt | 3 |
| Wrong way driving | 6 |
| Lane misuse | 4 |
| Use of cell phone | 3 |
| Inattention while driving | 3 |
| Following to close | 4 |
| Failing to return vehicle to office | 5 |
| Illegal U turn | 4 |
| Littering from a vehicle | 10 |
| Failing to signal | 2 |
| Improper parking | 2 |
| Speeding | 3 or more |

TABLE 1-continued

| Violation | Points |
| --- | --- |
| Texting while driving (TWD) | 25 and loss of license |
| Reckless driving | 25 |
| Failing to stop at red light | 8 |
| Driving in a restricted area | 6 pts |
| Illegal passenger | 3 pts |

System Architecture

FIG. 2 illustrates the system architecture of the driver training system in an exemplary embodiment. The client-server architecture includes an embedded mobile client system in a modified vehicle. A microprocessor in the embedded system controls operation of the vehicle through firmware embedded in a memory of the microprocessor, and communicates via a wireless receiver/transmitter with a plurality of server computers located in an operations center (facility network) of the driving park. The embedded client system further includes a speed controller device, an ID device reader, and a touch screen display console. The operations center includes the plurality of servers and at least one storage device for storing the driver records. One of the servers can be a host computer that directly communicates via wireless transmission with the embedded system in each vehicle. The plurality of servers can also include at least one database server, an administration server, and other servers providing additional functionality, along with the software needed to communicate with the embedded systems and operate the servers and driving record database. Registration and other workstations (including kiosks and point-of-sale terminals) are part of the system architecture. The workstations also enable drivers to access the driving park web site to take the online series of driving tests. The system further includes one or more handheld devices used by driving park police officers to communicate wirelessly with the operations center and vehicles. The handheld devices can be used to add information to the driver's file and debit the driver's account for the value assigned to each driving violation.

Processing Logic

Figure 3:
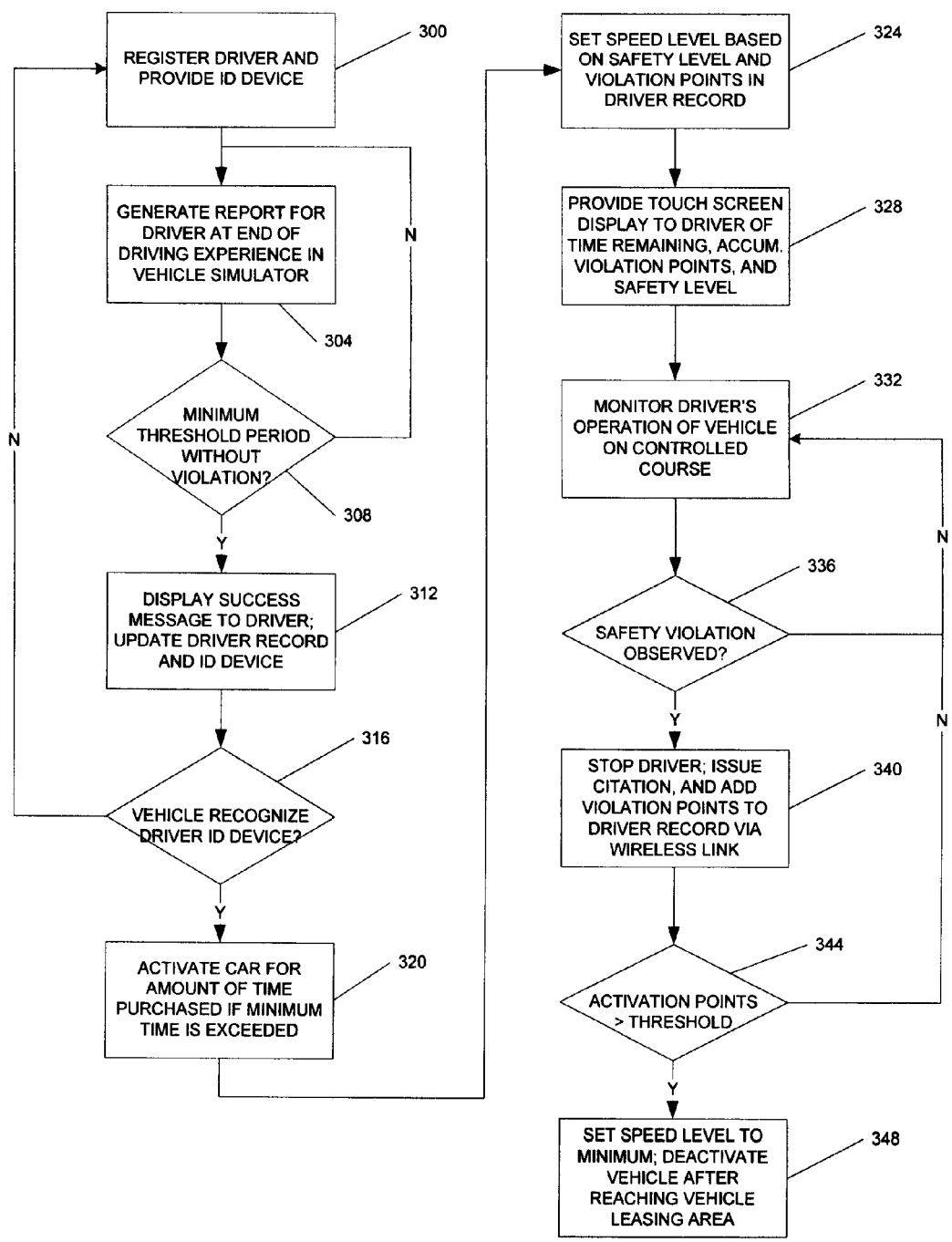
FIG. 3 illustrates the processing logic for controlling and monitoring driver performance and adherence to traffic safety rules in an exemplary embodiment.

FIG. 3 illustrates the processing logic for controlling and monitoring driver performance and adherence to traffic safety rules in an exemplary embodiment. The initial step in the process is for the driver to register with the controlled driving park officials, as indicated in block 300. The registered driver is provided with a portable information device such as a photo identification card that can be similar to a driver's license in appearance, and that includes a magnetic stripe or bar code containing pertinent information about the new driver. Alternatively, the portable information device could be a smart card with an embedded chip containing pertinent driver information. In another embodiment, the portable information device could be a radio frequency identification (RFID) card containing pertinent driver information. In one embodiment, the pertinent driver information could include name, date of birth, school, address, organ donor status, blood type, sex, examination date, and identification of the location of the controlled driving park. After registration, the portable information device will be used for reentry to the controlled driving park and to add and store driving time information that is purchased. In order to acquire driving time on the card, the card can be swiped at various kiosks in the controlled driving facility to purchase minutes of driving time. The minimum driving time that can be purchased is a preset threshold value that also corresponds to the minimum driving time that a driver can receive upon successful completion of a driving experience on a vehicle simulator. In one embodiment, the preset threshold value/minimum driving time can be 15 minutes. Factors that can affect the preset threshold value include driving conditions and number of persons waiting to drive a vehicle. Vehicle simulators can be kept in a driving arcade within the controlled driving park. The driver cannot access a vehicle until this minimum threshold time value is obtained from the system.

Once the driver is registered with the system, he can proceed to the driving arcade and swipe his portable information device at a portable information device reader associated with the vehicle simulator to identify himself to the system. The system will track the driver's performance in the vehicle simulator. If the driver achieves the minimum threshold value of minutes without a driving violation, the system will automatically inform the driver that he can proceed to the vehicle leasing area to operate a vehicle. A report is generated for the driver at the end of the vehicle simulator driving experience. The driver's record is stored in a database associated with a wireless computer communications system, including one or more server computers and wireless devices including handheld computers and other wireless devices. This step of the process is indicated in block 304.

Following the driving experience in the vehicle simulator, the system will determine if the driver has achieved the minimum threshold period without a driving violation as indicated in decision block 308. If the driver has achieved the minimum threshold period without a driving violation, a success message is displayed to the driver and the driver's record and identification card are updated, as indicated in block 312. If the driver has not achieved the minimum threshold period without a driving violation, the driver can continue the driving experience in the vehicle simulator. This is indicated by the loop back to block 304. Alternatively, the driver can also take one or more online driving instruction lessons and exams to improve his knowledge and skill before returning to the vehicle simulator.

After achieving the minimum threshold period without a violation the driver can proceed to the vehicle leasing area where the driver will be assigned a vehicle to drive. The driver swipes/inserts his identification card into a reader inside the vehicle to activate the vehicle automatically. In decision block 316, a determination is made if the identification card swiped/inserted into the vehicle's onboard card reader is recognized by the system. If it does not recognize the driver or validate the driver's credentials, the driver can return to the registration area to discuss his status with a controlled driving park official. A new identification card could be created to replace a faulty card if the identification card fails to update the driver's status with the system. The problem with failing to activate the vehicle could be the result of insufficient credits earned in the vehicle simulator, or not having a sufficient pre-paid minutes balance on the card.

If the system does recognize the driver portable information device in decision block 316, the vehicle will be automatically activated if the amount of time purchased is enough so that the driver can start and operate the vehicle on the streets of the controlled driving park. This step is indicated in block 320. For example, in one embodiment, at least 15 minutes of driving time would need to be purchased in order to activate the vehicle. The user may be able to add more driving time directly through the portable information device reader user interface in the vehicle. Once activated, the system automatically sets the speed level based on the driver's safety level and violation points that are stored in the driver record stored in the database. This step is indicated in block 324. The system provides, for example, three progressive speed levels based on the driver's record. For example, in one embodiment, the speed levels can be 5, 10, and 15 miles per hour, respectively. The driver's safety level will determine the maximum speed permitted by the driver. In other embodiments, more levels and different speeds could be set. The safety and age of the driver, as well as the vehicle type, are factors in determining the speed levels that are set. A touch screen user interface display is provided in each vehicle to inform the driver of his driving time remaining, the accumulated violation points, and the driver's safety level, as indicated in block 328.

As the driver drives the vehicle along the streets of the controlled driving park, his operation of the vehicle will be monitored by a patrol officer who is patrolling the driving park. This step is indicated in block 332. One advantage of having a patrol officer in the controlled driving park is to provide a more realistic driving experience to the driver. In one embodiment, the driver's operation of a vehicle can be monitored on computer displays in an operations control room. Cameras in the controlled driving park transmit digital video wirelessly to the computer servers in the operations control room.

As the patrol officer patrols the controlled driving park, he will determine if any of the drivers in the vehicles being monitored has violated a safety rule. This step is indicated in decision block 336. If a safety violation has been observed, the patrol officer will stop the driver and issue a citation or warning. If the officer issues a citation, the officer will use a wireless handheld device to transmit the safety violation type to the servers in the operations room. The violation and corresponding points will be added to the driver's stored record in the database. The violation points will also be transmitted to the vehicle user interface display to inform the driver of his new total violation points. This step is indicated in block 340. In one embodiment, the officer's handheld can automatically transmit the violation points to an onboard embedded processor in the vehicle that will add the new points to the driver's previous points total.

In decision block 344, a determination is made if the driver's activation points exceed a threshold value. In one embodiment, the threshold value could be 25 points. In other embodiments, a higher or lower threshold value could be used. Violation points that exceed the threshold value or expiration of the allowed driving time will cause the speed of the vehicle to drop to a very low level that will enable the driver to return the vehicle to the vehicle leasing area. For example, in one embodiment, the low level speed could be set to 2 miles per hour. Once the vehicle is returned to the vehicle leasing area, the vehicle can be deactivated by a stop button on the touch screen user interface. These steps are indicated in block 348.

Figure 4:
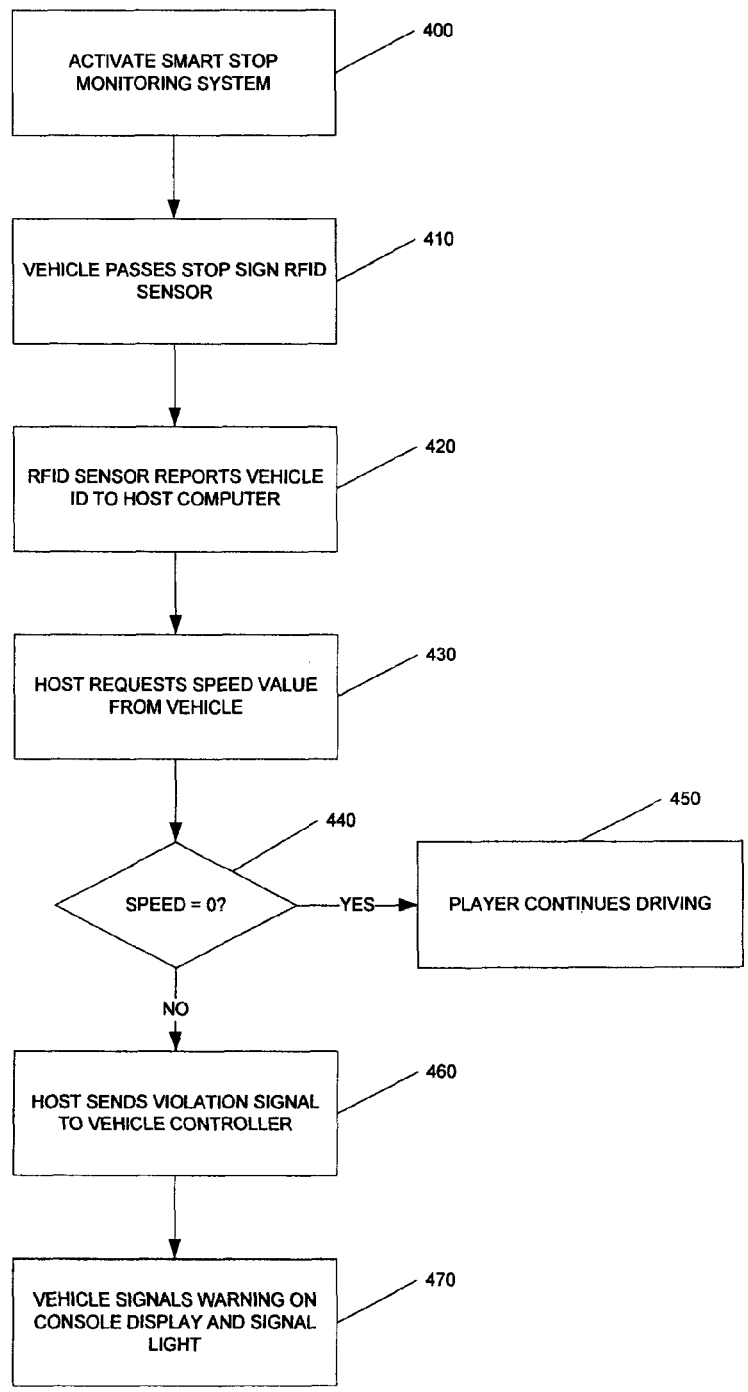
FIG. 4 illustrates the processing logic for the smart stop monitoring feature in an exemplary embodiment.

FIG. 4 illustrates the processing logic for the smart stop monitoring feature in an exemplary embodiment. This feature can be combined with the monitoring and control system described herein. In order to use this feature, the smart stop monitoring system must be activated as indicated in block 400. One or more RFID sensors positioned on or in proximity to a stop sign can detect the presence of an approaching vehicle in a zone extending from the location of the sensors to an area that the approaching vehicle will pass through. The RFID sensors are activated remotely from the server computers in the operations control room via the wireless communications network.

In system operation with the smart stop monitoring feature activated, the vehicle passes the stop sign RFID sensors as indicated in block 410. The RFID sensors detect the vehicle identifier and transmit the vehicle ID to a host computer (e.g., one of the server computers) as indicated in block 420. The host computer then requests the speed value from the vehicle in block 430. A determination is made if the speed is zero in decision block 440, meaning that the vehicle has come to a complete stop. If the speed is determined to be zero, the driver can continue to operate the vehicle in the controlled driving park without interruption, as indicated in block 450. If the vehicle does not come to a complete stop, the host sends a violation signal to the vehicle controller as indicated in block 460. The onboard processor in the vehicle will then signal a warning on the touch screen console display in the vehicle and will also turn on the signal light on top of the vehicle. These steps are indicated in block 470.

Figure 5:
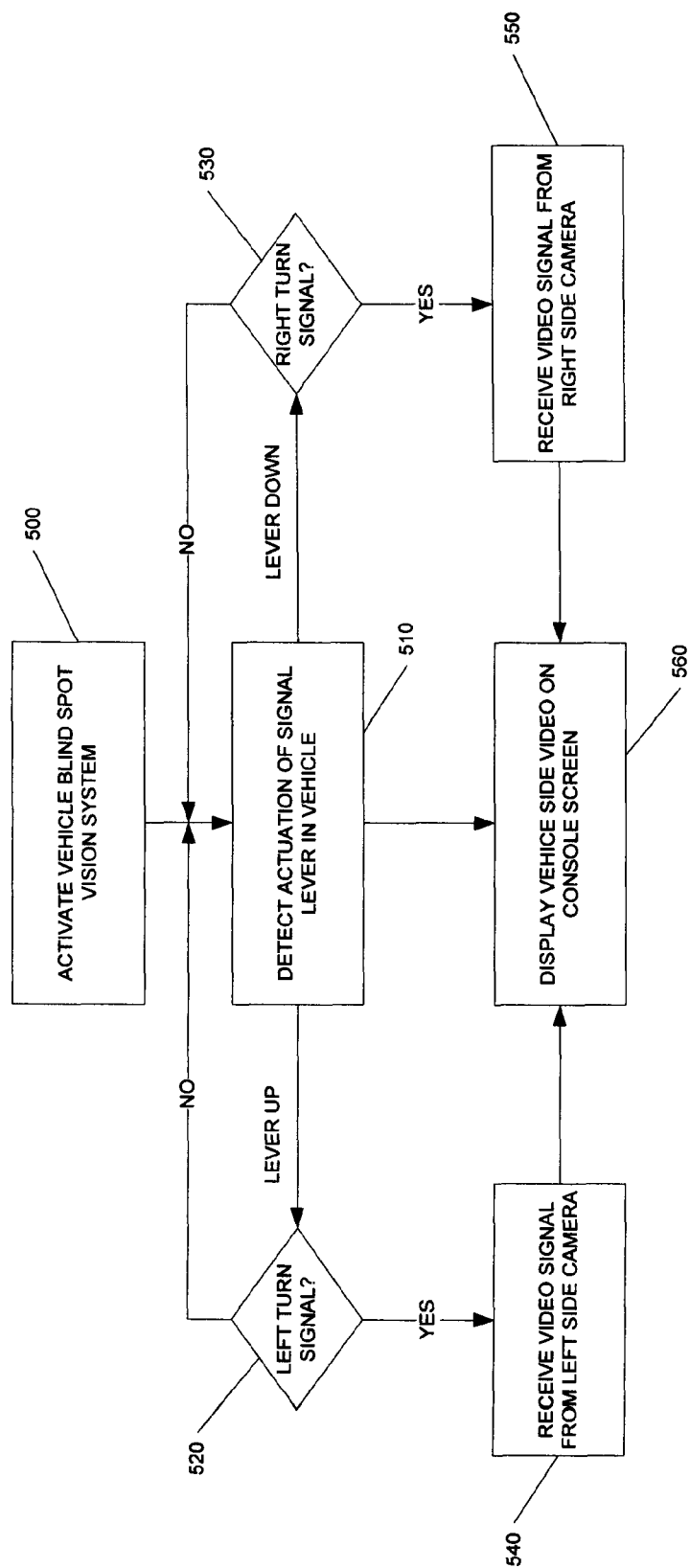
FIG. 5 illustrates the processing logic for the blind spot vision feature in an exemplary embodiment.

FIG. 5 illustrates the processing logic for the blind spot vision feature in an exemplary embodiment. This feature can be combined with the monitoring and control system and the smart stop monitoring feature described herein. In order to use this feature, the blind spot vision system must be activated as indicated in block 500. In one embodiment, the blind spot vision feature can be activated automatically when the vehicle is activated by an authorized driver. An authorized driver is an individual who has successfully completed the requirements for operating a vehicle in the controlled driving park. Once activated, the blind spot vision feature will detect actuation of the turn signal lever in the vehicle as indicated in block 510. The lever will be actuated by the driver to signal a lane change or a turn at an intersection in accordance with the customary rules of the road for safe and legal driving. At least two cameras are positioned on the vehicle to stream live video signals of the driver's left and right blind spots. The cameras stream the live video to the touch screen console display in the vehicle to make the driver aware of any vehicles that are in his blind spots prior to changing lanes.

The driver will flip the turn signal indicator either up or down to signal a lane change. In decision block 520, a determination is made if the driver has indicated a left turn or lane change. If a left turn is signaled, the video camera on the left side of the vehicle will generate a video signal that is transmitted to the onboard processor. The processor receives the video signal as indicated in block 540 and sends the video signal to the console screen where it is displayed to the driver as indicated in block 560. If a right turn is signaled, the video camera on the right side of the vehicle will generate a video signal that is transmitted to the onboard processor. The processor receives the video signal as indicated in block 550 and sends the video signal to the console screen where it is displayed to the driver as indicated in block 560. If the driver actuates the signal lever but then turns it off without a lane change, the blind spot vision system processing logic will loop from decision blocks 520, 530 back to block 510.

FIGS. 6A-6E illustrate the processing logic for the vehicle control software in an exemplary embodiment. As discussed previously, the driver registers with the driving park using a photo ID, and receives a portable information device (e.g., magnetic or smart card) that is used to access the driving park and amusements including the vehicles. This step is indicated in block 600 of FIG. 6A. The driver transfers money, for example using cash or credit, to his park account, which is the account accessed by the driver's portable information device, as indicated in block 604. The amount transferred is represented as driving points on the driver's account. In an alternate embodiment, the processing logic can determine if the driver already has a driver's license for the driving park and, if so, whether the driver has accumulated less than a predetermined threshold number of violation points (e.g. <10 points). In this case, the driver can receive a discount on money transferred to his credits/units account balance. After transferring money to his account, the driver can then practice driving on vehicle simulators, as indicated in block 608. In decision block 612, a test is made to determine if the driver has successfully passed the safe driving requirements of the simulator. If not, the driver can continue to practice on the simulator. If the driver has completed a minimum required safe driving time on the simulator, a test is made in decision block 616 to determine if he has a minimum amount of driving points on account. If not, the driver will have to transfer additional money to his account before he can access a vehicle. If the account has at least the minimum amount of driving points, the assigned vehicle will be activated by reading of the driver's ID device at the device reader of the onboard system in the vehicle. This step is indicated in block 620. For a first time driver, the speed level is set to speed level #1 (e.g., 5 mph), as indicated in block 624. The speed level is controlled by the onboard processor using relays in the speed controller device as shown in FIG. 7. The driver can now start and drive the vehicle on permitted roads in the driving park. This step is shown in block 628.

As the driver drives the vehicle, he may commit one or more driving violations. A test for driving violations is performed in block 632. Depending on the severity of the violation, a different number of violation points are added to his stored driving record.

Figure 6A:
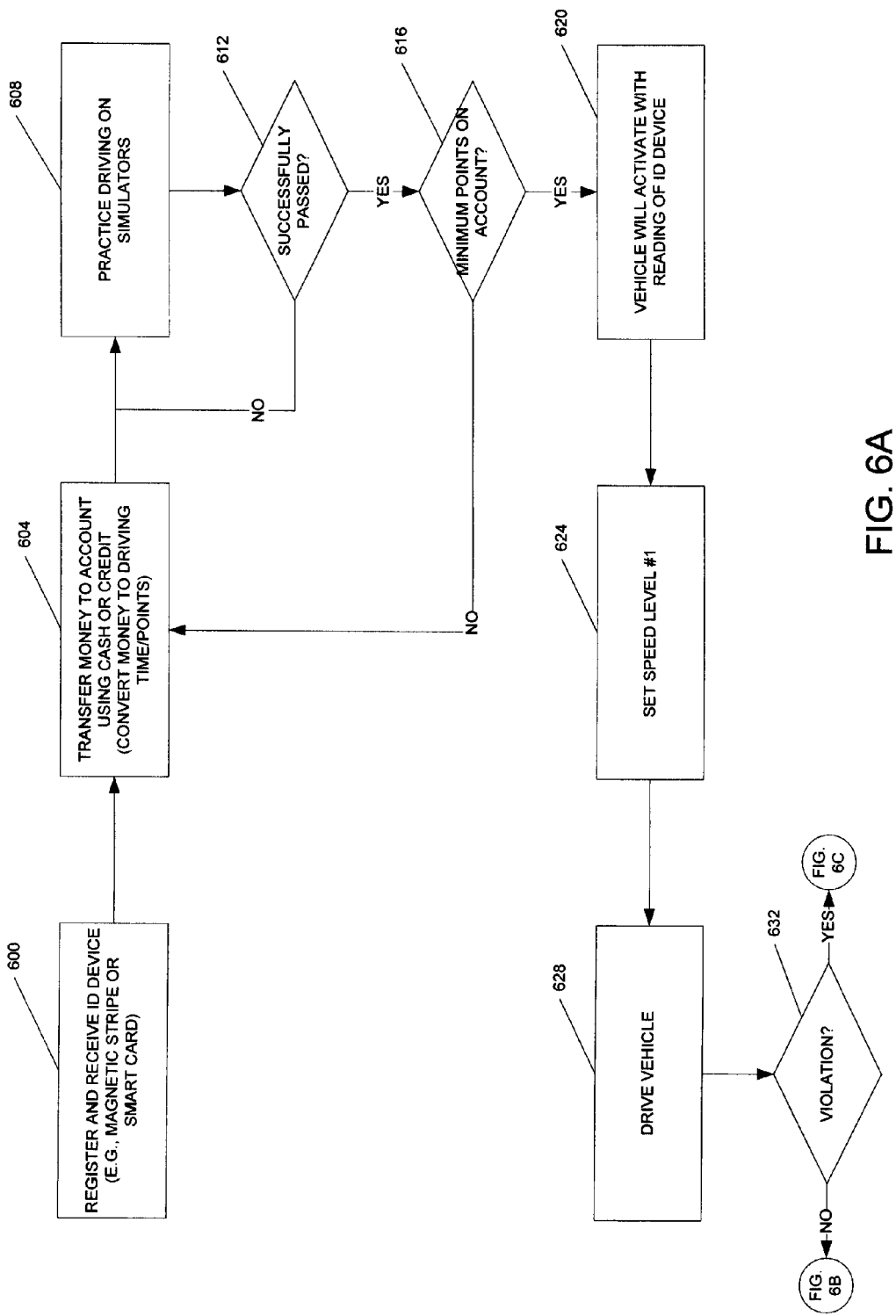
FIGS. 6A-6E illustrate the processing logic for the vehicle control software in an exemplary embodiment.
Figure 6B:
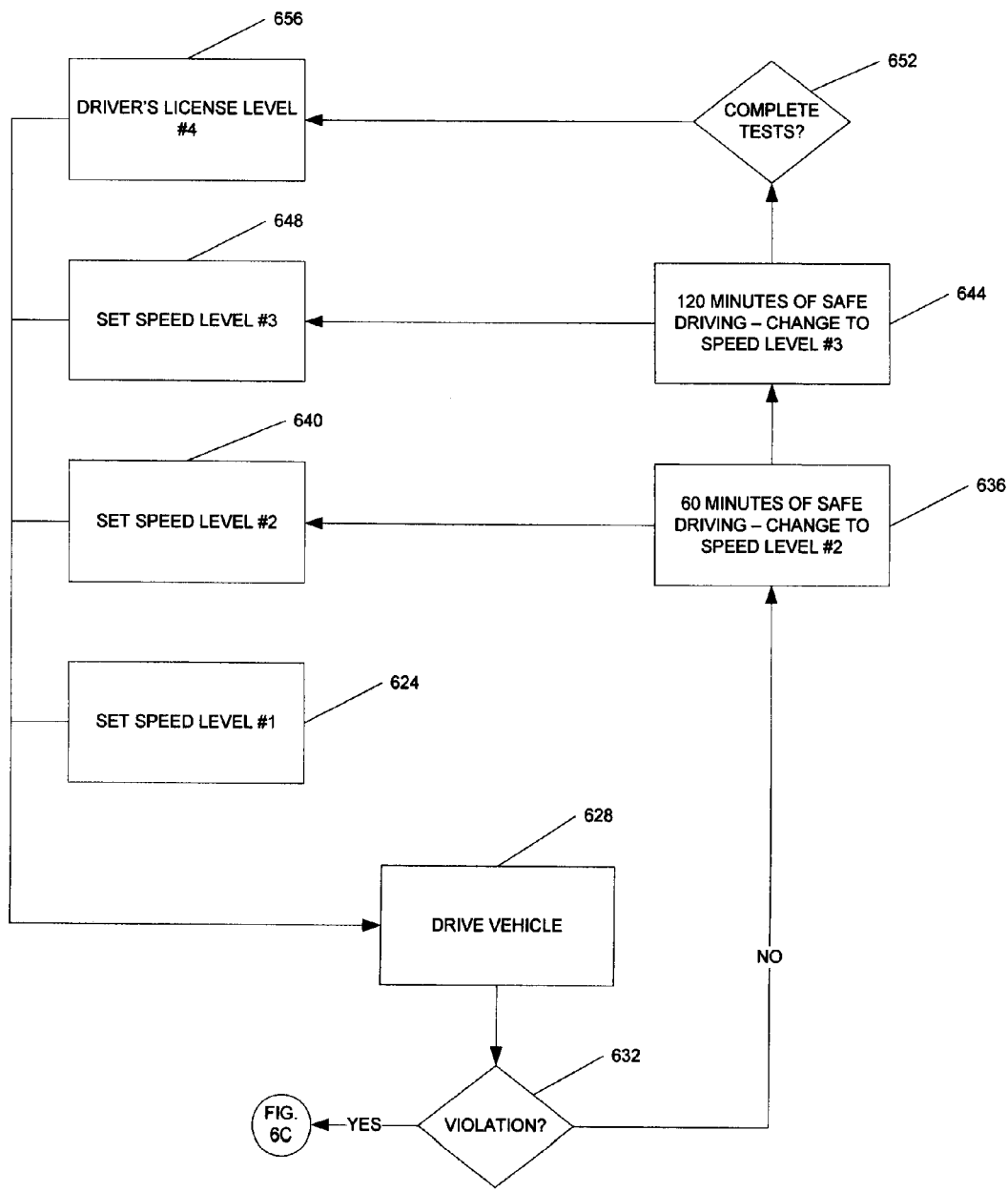
Figure 7:
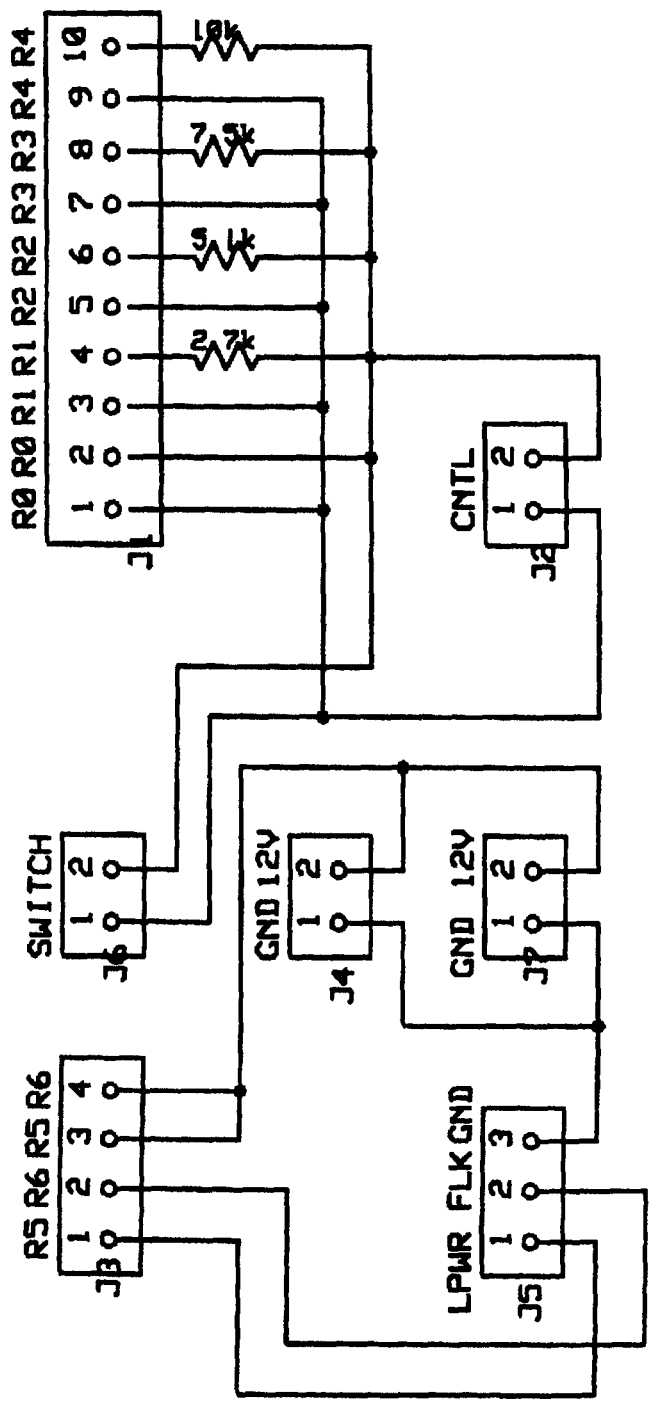
FIG. 7 illustrates a circuit diagram for a speed controller that can be used to control vehicle speed in an exemplary embodiment.

FIG. 6B illustrates the processing logic associated with controlling vehicle speed for safe driving. If no violations are detected in decision block 632, successful safe driving for a speed adjustment interval, for example, 60 minutes results in a change to speed level #2 as indicated in block 636. The embedded processor sends a signal to the speed controller to set the speed level to speed level #2, as indicated in block 640. In some embodiments, safe driving for over 60 minutes, with no warnings or violations on the driver's record could result in extra driving time being added to the driver's card (e.g., 10 minutes). Continued successful safe driving for a subsequent speed adjust interval, for example, a total driving time of 120 minutes, results in a change to the next level, for example, speed level #3, as indicated in block 644. The embedded processor sends a signal to the speed controller to set the speed level to speed level #3, as indicated in block 648. In some embodiments, safe driving for more than the two speed adjust intervals, e.g., over 120 minutes, with no violations on the driver's record could also result in extra driving time being added to the driver's account (e.g., 15 minutes). With, for example, 120 minutes of safe driving and no violations, a final test is made, as indicated in decision block 652, to determine if the driver has also completed all online driving tests. If he has, the driver is now eligible for the driving park driver's license which will enable the driver to access the driving park highway as well as other restricted driving areas of the driving park. If the driver has not passed all the online driving tests, he must complete them before being issued a driving park driver's license.

Figure 6C:
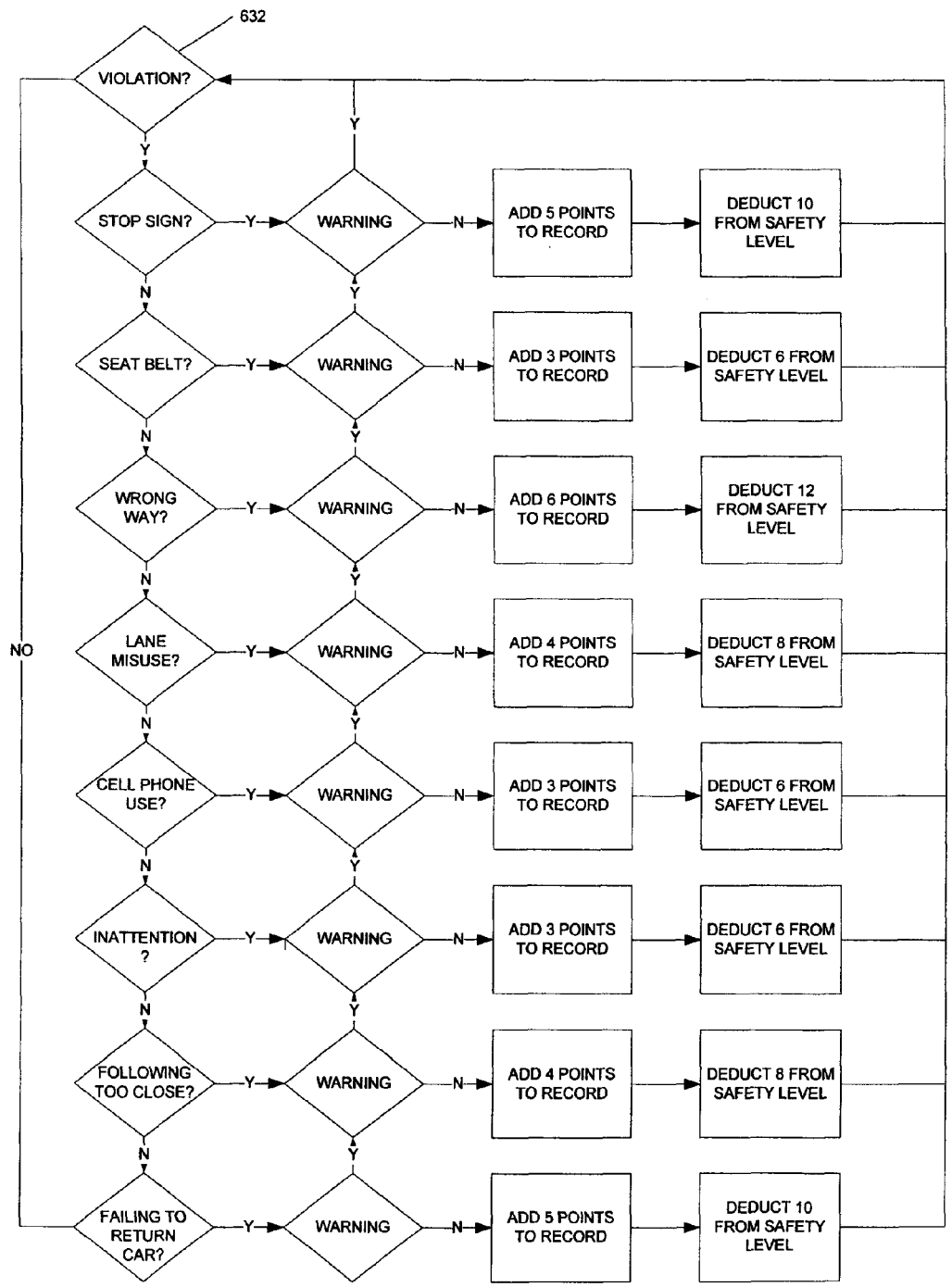
Figure 6D:
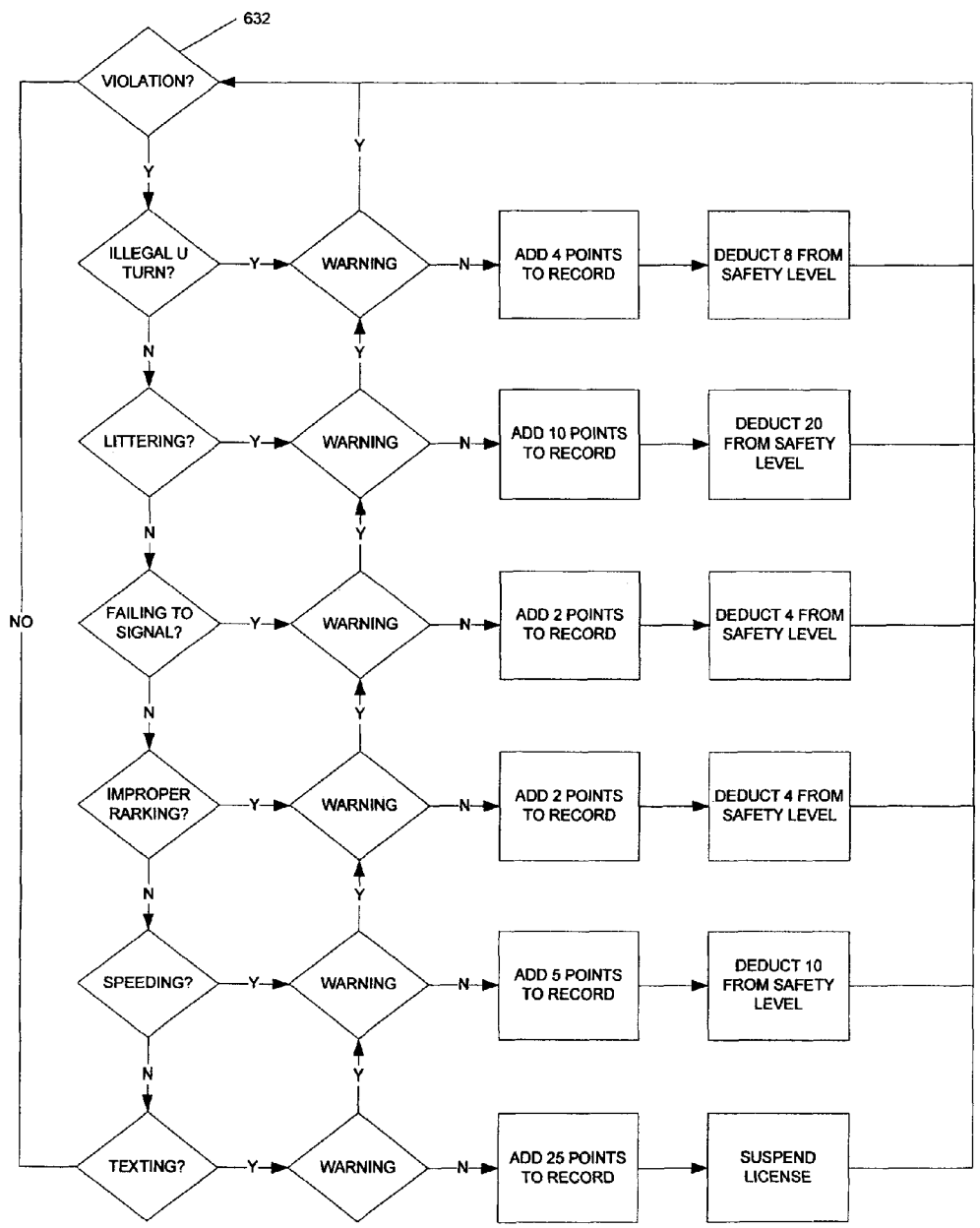
Figure 6E:
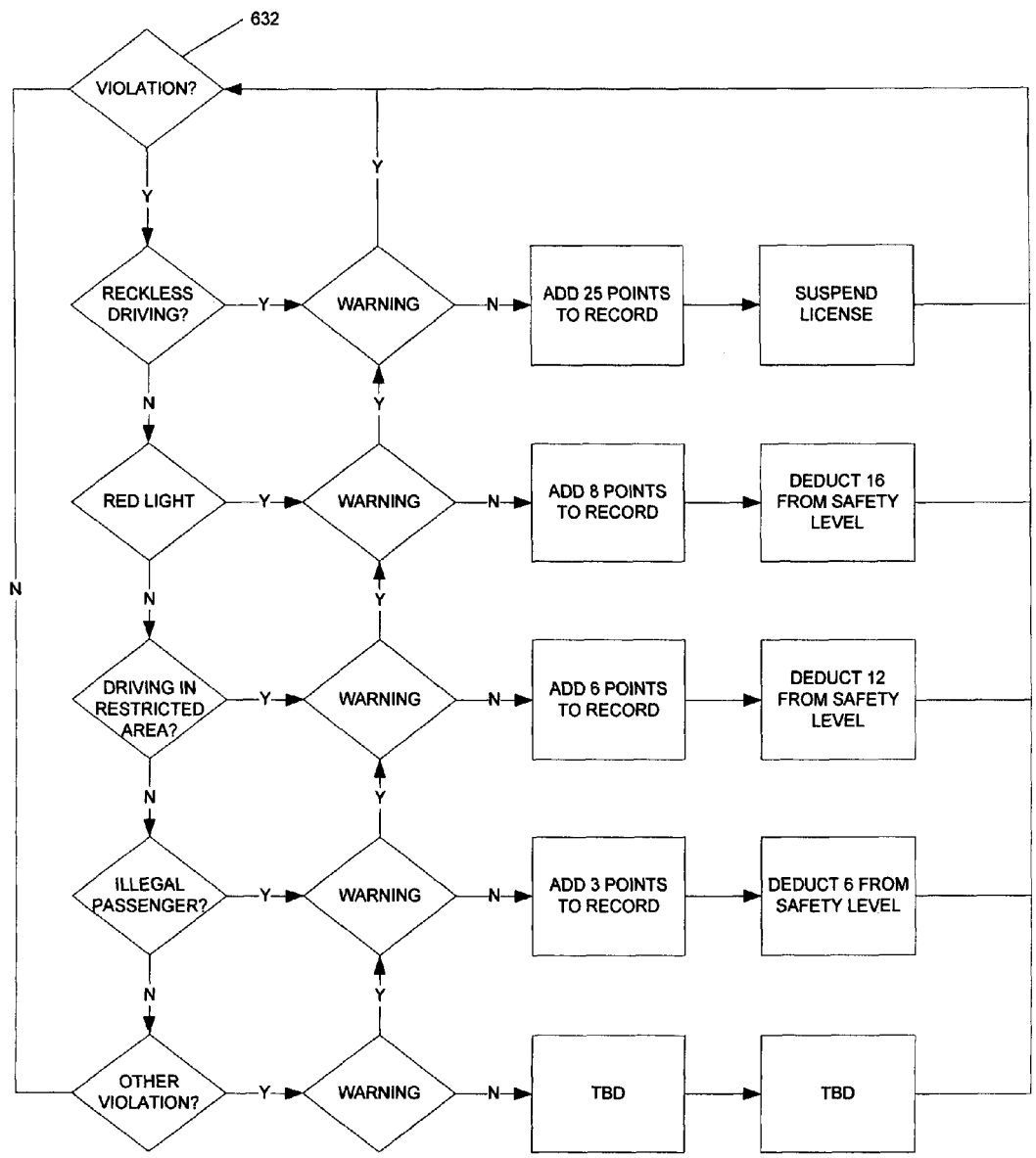

FIGS. 6C-6E depict the processing logic for determining which violation or violations occurred, the points assigned to each violation, and the corresponding decrement in safety level resulting from the violation. FIGS. 6C-6E have been simplified to omit the following additional steps. Each of the driving violations when detected will first result in setting a current value for driver violation points in the processing logic to the number of points assigned for the specific violation. For example, failure to stop at a stop sign will result in the current violation points being set to 5. If a warning is not issued to the driver, the current value for driver violation points will be added to the driving record for the driver. The safety level will also have a deduction of twice the number of points added to the driver's record. In some embodiments, the vehicle can also be stopped for a number of minutes that represents the number of violation points added to the driver's record. If the driver is issued a warning, and the warning is the first warning to the driver, the warning will be added to the driver's record. If the driver is issued a warning, but the warning is not the first warning, the current value for violation points will be added to the driver's record.

Figure 8:
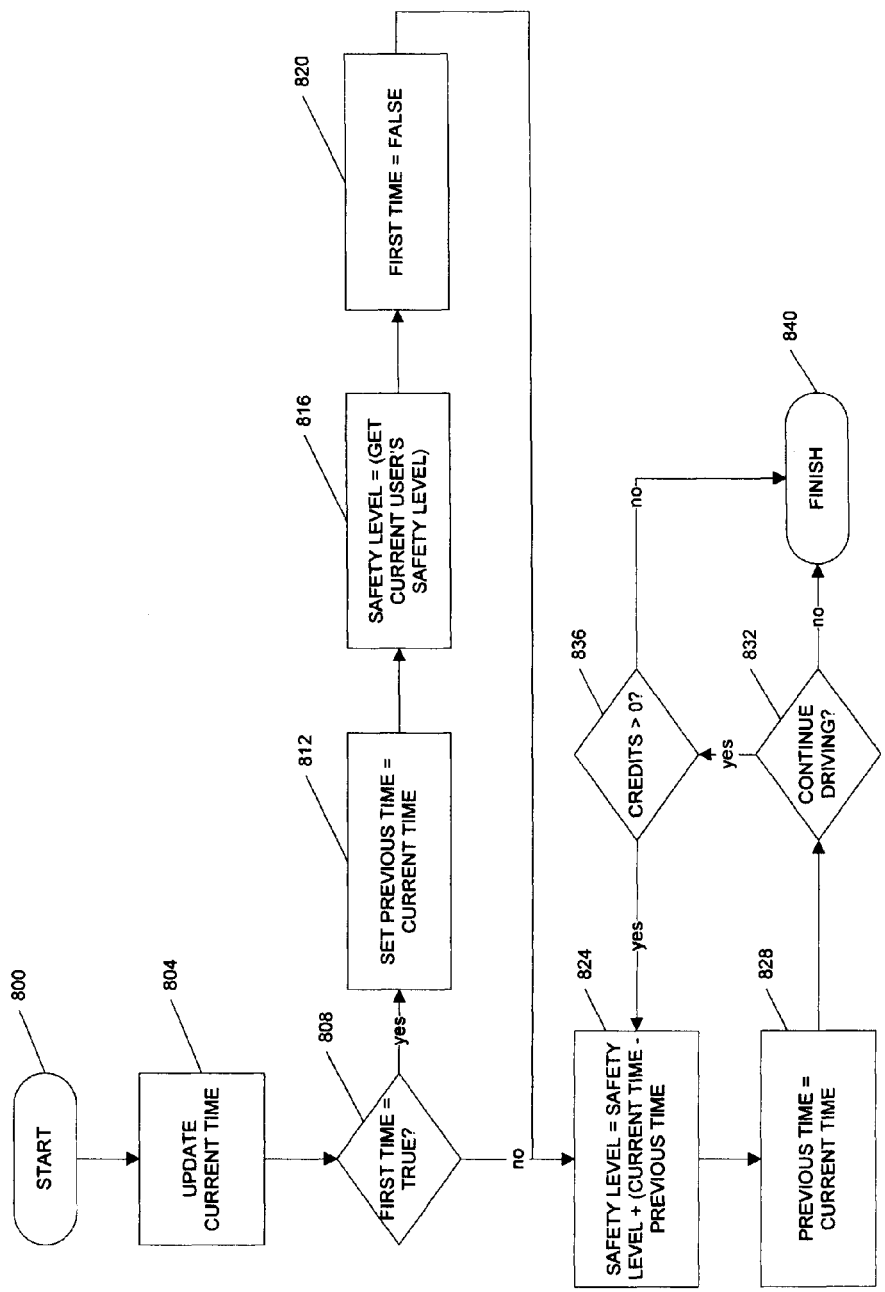
FIG. 8 illustrates the processing logic for determining the safety level associated with a driver's data record in an exemplary embodiment.

FIG. 8 illustrates the processing logic for determining the safety level associated with a driver in an exemplary embodiment. The processing logic begins in block 800, as indicated. The current time value is updated in block 804. A test for the Boolean value of a "First Time" variable is determined in decision block 808. If "First Time" is true, processing continues in block 812 where the previous time value is set to the current time. The driver's safety level is then obtained from the driver's data record stored in the at least one storage device in the driving park operations center. The Boolean value of "First Time" is set to false as indicated in block 820. From either decision block 808 or block 820, processing continues as indicated in logic block 824 in which the safety level is set to the current safety level plus the difference between the current time and the previous time. Then, the previous time is set equal to the current time as indicated in block 828. As long as the driver continues to drive the vehicle, the safety level will continue to increase. In decision block 832, the driver makes a decision to continue driving on the course or to return the vehicle. If the driver decides to continue driving, a determination is made in decision block 836 if the driver has driving credits remaining. He can continue driving the vehicle and the safety level will continue to increase. If the driver either decides to return the vehicle or if his driving credits remaining is zero, the processing logic for determining safety level will end. If the driver runs out of driving credits and fails to return the vehicle, a violation will be issued by the system and the violation points will be added to his driving record. The violation can be entered via the police hand held device or automatically by the system. In the event of a failure to return the vehicle after running out of driving credits, the safety level will stop increasing. The driver's record stored in the driving record database located on the at least one storage device is updated at the end of the driving session to store the driving credits remaining and the last safety level. Each time the driver activates a vehicle in the driving park, the driving credits, safety level, and violation points are downloaded to the vehicle's onboard microprocessor and displayed on the vehicle's display console. The safety level process ends in block 840.

Speed Controller

FIG. 7 illustrates a circuit diagram for a speed controller that can be used to control vehicle speed in an exemplary embodiment. The speed controller includes relays and circuits to set and change the speed in the vehicle, to activate and stop the vehicle, and to activate the light on the vehicle. The speed controller is connected to the onboard processor.

Embodiments of the invention have been described as computer-implemented processes. It is important to note, however, that those skilled in the art will appreciate that the mechanisms of the embodiments described are capable of being distributed as a program product in a variety of forms, and that the invention applies regardless of the particular type of the non-transitory computer readable storage media utilized to carry out the distribution. Examples of computer readable storage media include, without limitation, recordable-type media such as Compact Flash cards, portable hard drives, diskettes, CD ROMs, memory sticks, and flash drives.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiments are possible without departing from the scope of the present invention.

In addition, it is possible to use some of the features of the embodiments disclosed without the corresponding use of the other features. Accordingly, the foregoing description of the exemplary embodiments is provided for the purpose of illustrating the principles of the invention, and not in limitation thereof, since the scope of the present invention is defined solely by the claims.

What is claimed is:

1. A method for monitoring and controlling driver performance, in a controlled driving environment comprising:
   generating and storing a record for each registered driver in a database associated with a server computer;
   receiving a signal at the server computer from a vehicle controller to determine a driver's performance level and driving time balance from the stored driver record;
   activating a vehicle for at least an amount of time exceeding a preset threshold value based on the driving time balance;
   dynamically setting a speed level and a safety level for the vehicle based on the driver's performance level in the driving environment;
   monitoring the driver's performance in the controlled driving environment and determining each driving violation that occurs;
   assigning violation points to the driver based on each driving violation and adding the violation points to the driver record stored in the database;
   setting the speed level to a value less than a threshold speed level if the violation points stored for the driver exceeds a violation points threshold; and
   activating a blind spot vision system in the vehicle automatically when the vehicle is activated by the vehicle controller.

2. The method for monitoring and controlling driver performance of claim 1 further comprising streaming live video signals of the driver's blind spots from at least one camera positioned on the vehicle to an onboard processor for display on the touch screen display.

3. A method for monitoring and controlling driver performance, in a controlled driving environment comprising:
   generating and storing a record for each registered driver in a database associated with a server computer;
   receiving a signal at the server computer from a vehicle controller to determine a driver's performance level and driving time balance from the stored driver record;
   activating a vehicle for at least an amount of time exceeding a preset threshold value based on the driving time balance;
   dynamically setting a speed level and a safety level for the vehicle based on the driver's performance level in the driving environment;
   monitoring the driver's performance in the controlled driving environment and determining each driving violation that occurs;
   assigning violation points to the driver based on each driving violation and adding the violation points to the driver record stored in the database; and
   setting the speed level to a value less than a threshold speed level if the violation points stored for the driver exceeds a violation points threshold,
   wherein the safety level represents an accumulated amount of driving time without incurring any violation points.

4. The method for monitoring and controlling driver performance of claim 3 further comprising determining if an onboard reader in the vehicle recognizes a driver's portable information device provided to the driver for enabling vehicle activation.

5. The method for monitoring and controlling driver performance of claim 3 further comprising providing a touch screen interface in the vehicle for displaying driving time remaining, accumulated violation points, and a safety level.

6. The method for monitoring and controlling driver performance of claim 3 wherein dynamically setting the speed level comprises monitoring the safety level and automatically increasing the speed level when the safety level meets or exceeds a safety level threshold and automatically decreasing the speed level when the safety level falls below the safety level threshold.

7. The method for monitoring and controlling driver performance of claim 3 further comprising remotely activating a plurality of sensors positioned on or in proximity to a stop sign to detect the presence of an approaching vehicle in a driving zone near the stop sign.

8. The method for monitoring and controlling driver performance of claim 7 wherein the plurality of sensors detects a vehicle identifier and speed and transmits the vehicle identifier and speed to the server computer.

9. The method for monitoring and controlling driver performance of claim 8 wherein the server computer transmits a violation signal to the vehicle controller which generates a warning signal on the touch screen display and activates a signal light on the vehicle.

10. A system for monitoring and controlling driver performance in a controlled driving environment comprising:
    at least one server computer and a wireless transceiver associated with the at least one server computer, the computer being configured to control operation of a vehicle in a driving environment via the wireless transceiver;
    at least one storage device for storing driver records for each driver registered with the server computer; and
    an embedded mobile client in the vehicle, the embedded mobile client including a microprocessor having monitoring and control firmware embedded in a memory,
    a wireless transceiver configured to communicate with the server computer,
    a speed controller device connected to the microprocessor and configured to automatically control a speed of the vehicle during operation in the driving environment,
    a portable information device reader configured to receive driver information stored on a portable information device provided to each registered driver in order to activate the vehicle via a signal from the microprocessor, and
    a touch screen user interface configured to display a driving time remaining, an accumulated violation points, and a safety level for the driver.

11. The system for monitoring and controlling driver performance of claim 10 wherein the server computer monitors the driver's performance in the controlled driving environment and determines each driving violation that occurs.

12. The system for monitoring and controlling driver performance of claim 10 wherein the server computer assigns violation points to the driver based on each violation and adds the violation points to the driver record stored in a database on the storage device via a wireless communications link.

13. The system for monitoring and controlling driver performance of claim 10 wherein the server computer transmits a signal to the microprocessor in the embedded client to set the vehicle speed level to a value less than a threshold level if the violation points stored for the driver exceeds a violation points threshold.

14. The system for monitoring and controlling driver performance of claim 10 further comprising a plurality of sensors positioned on or in proximity to a stop sign for detecting the presence of an approaching vehicle in a driving zone near the stop sign, wherein the plurality of sensors detects a vehicle identifier and speed and transmits the vehicle identifier and speed to the server computer.

15. The system for monitoring and controlling driver performance of claim 14 wherein the server computer transmits a violation signal to the microprocessor in the embedded client which generates a warning signal on the touch screen display and activates a signal light on the vehicle.

16. The system for monitoring and controlling driver performance of claim 10 further comprising a blind spot vision system in the vehicle which is activated automatically when the vehicle is activated by the vehicle controller.

17. The system for monitoring and controlling driver performance of claim 16 further comprising at least one camera positioned on the vehicle for streaming live video signals of the driver's blind spots to the microprocessor for display on the touch screen display.

18. The system for monitoring and controlling driver performance of claim 10 wherein the server computer dynamically sets a speed level and a safety level for the vehicle based on the driver's performance level in the driving environment.

19. The system for monitoring and controlling driver performance of claim 18 wherein the server dynamically sets the safety level by determining an accumulated amount of driving time without incurring any violation points.

20. The system for monitoring and controlling driver performance of claim 19 wherein the server dynamically sets the speed level by monitoring the safety level and automatically increasing the speed level when the safety level meets or exceeds a safety level threshold and automatically decreasing the speed level when the safety level falls below the safety level threshold.

21. A non-transitory computer readable storage medium for monitoring and controlling driver performance in a controlled driving environment when executed on a computing system, the computer readable storage medium having computer readable code embedded therein, the computer readable storage medium comprising:

program instructions for generating and storing a record for each registered driver in a database associated with a server computer;

program instructions for processing a query from a vehicle controller to determine a driver's performance level and driving time balance from the stored driver record;

program instructions for generating a signal to activate a vehicle for at least an amount of time exceeding a preset threshold value based on the driving time balance;

program instructions for generating a signal to dynamically set a speed level and a safety level for the vehicle based on the driver's performance level in the driving environment;

program instructions for processing monitoring information on the driver's performance in the controlled driving environment;

program instructions for assigning violation points to the driver based on each driving violation and adding the violation points to the driver record stored in the database; and program instructions for generating a signal to set the speed level to a value less than a threshold speed level if the violation points stored for the driver exceed a violation points threshold.

* * * * *